United States Patent
Balamane et al.

(10) Patent No.: US 8,619,535 B2
(45) Date of Patent: *Dec. 31, 2013

(54) THERMALLY ASSISTED RECORDING HEAD HAVING RECESSED WAVEGUIDE WITH NEAR FIELD TRANSDUCER AND METHODS OF MAKING SAME

(75) Inventors: Hamid Balamane, Portola Valley, CA (US); Thomas Dudley Boone, Jr., San Jose, CA (US); Neil Leslie Robertson, Palo Alto, CA (US); Barry Cushing Stipe, San Jose, CA (US); Timothy Carl Strand, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 3 days.

This patent is subject to a terminal disclaimer.

(21) Appl. No.: 13/438,811

(22) Filed: Apr. 3, 2012

(65) Prior Publication Data

US 2012/0218871 A1  Aug. 30, 2012

Related U.S. Application Data

(63) Continuation of application No. 12/347,084, filed on Dec. 31, 2008, now Pat. No. 8,169,881.

(51) Int. Cl.
*G11B 7/135* (2012.01)

(52) U.S. Cl.
USPC ............. 369/112.27; 369/13.02; 369/13.32; 369/13.33

(58) Field of Classification Search
USPC ................. 369/13.02, 13.32, 13.33, 112.27
See application file for complete search history.

(56) References Cited

U.S. PATENT DOCUMENTS

| | | |
|---|---|---|
| 5,022,018 A | 6/1991 | Vogelgesang |
| 5,696,372 A | 12/1997 | Grober et al. |
| 6,236,514 B1 | 5/2001 | Sato |
| 6,303,402 B1 | 10/2001 | Hatano et al. |
| 6,429,419 B1 | 8/2002 | Mitsuoka et al. |
| 6,657,926 B2 | 12/2003 | Burroughs |
| 6,724,718 B1 | 4/2004 | Shinohara et al. |
| 6,771,589 B2 | 8/2004 | Ueyanagi et al. |
| 6,839,191 B2 | 1/2005 | Sugiura et al. |
| 6,944,101 B2 | 9/2005 | Johns et al. |
| 6,970,307 B2 | 11/2005 | Sugiura et al. |
| 6,999,384 B2 | 2/2006 | Stancil et al. |

(Continued)

FOREIGN PATENT DOCUMENTS

| | | |
|---|---|---|
| CN | 101000770 A | 7/2007 |
| JP | 2006/202449 | 8/2006 |

OTHER PUBLICATIONS

Chinese Office Action Summary from application No. 200910261887.9 dated Jun. 9, 2011 (no translation).

(Continued)

*Primary Examiner* — Brenda Bernardi
(74) *Attorney, Agent, or Firm* — Zilka-Kotab, PC

(57) ABSTRACT

An apparatus according to one embodiment includes a near field transducer comprising a conductive metal film; and an optical waveguide for illumination of the near field transducer, a light guiding core layer of the optical waveguide being spaced from the near field transducer by less than about 100 nanometers and greater than 0 nanometers, wherein a longitudinal axis of the optical waveguide is substantially perpendicular to an air bearing surface.

23 Claims, 9 Drawing Sheets

(56) References Cited

U.S. PATENT DOCUMENTS

| | | |
|---|---|---|
| 7,042,810 B2 | 5/2006 | Akiyama et al. |
| 7,250,598 B2 | 7/2007 | Hollingsworth et al. |
| 7,272,102 B2 | 9/2007 | Challener |
| 7,307,923 B2 | 12/2007 | Miyanishi et al. |
| 7,359,599 B2 | 4/2008 | Matsumoto |
| 7,379,415 B2 | 5/2008 | Song et al. |
| 7,599,277 B1 | 10/2009 | Kato et al. |
| 7,652,954 B2 | 1/2010 | Fontana, Jr. et al. |
| 7,880,996 B2 | 2/2011 | Stipe |
| 8,169,881 B2 | 5/2012 | Balamane et al. |
| 2005/0047283 A1* | 3/2005 | Ruigrok ............ 369/13.14 |
| 2006/0018211 A1 | 1/2006 | Ueyanagi et al. |
| 2007/0081426 A1 | 4/2007 | Lee et al. |
| 2007/0081427 A1 | 4/2007 | Suh et al. |
| 2007/0177302 A1 | 8/2007 | Shimazawa et al. |
| 2007/0230010 A1 | 10/2007 | Jin et al. |
| 2007/0230047 A1 | 10/2007 | Jin et al. |
| 2007/0286031 A1 | 12/2007 | Matsumoto |
| 2008/0055762 A1 | 3/2008 | Shimazawa et al. |
| 2008/0181560 A1 | 7/2008 | Suh et al. |
| 2008/0198496 A1 | 8/2008 | Shimazawa et al. |
| 2009/0258186 A1* | 10/2009 | Fontana et al. ............ 428/131 |
| 2009/0290454 A1* | 11/2009 | Fontana et al. ............ 369/13.13 |
| 2010/0128578 A1 | 5/2010 | Kato et al. |

OTHER PUBLICATIONS

Shi et al., "A Nano-aperture with 1000× Power Throughput Enhancement for Very Small Aperture Laser System (VSAL)," 2002 SPIE, Optical Data Storage 2001, Proceedings of SPIE vol. 4342, 2002, pp. 320-327.

Shi, X., "Design of a C Aperture to achieve $\lambda/10$ resolution and resonant transmission," 2004 Optical Society of America, vol. 21, No. 7, Jul. 2004, pp. 1305-1317.

Non-Final Office Action Summary from U.S. Appl. No. 12/347,084 dated Sep. 6, 2011.

Notice of Allowance and Fee(s) Due from U.S. Appl. No. 12/347,084 dated Jan. 6, 2012.

* cited by examiner

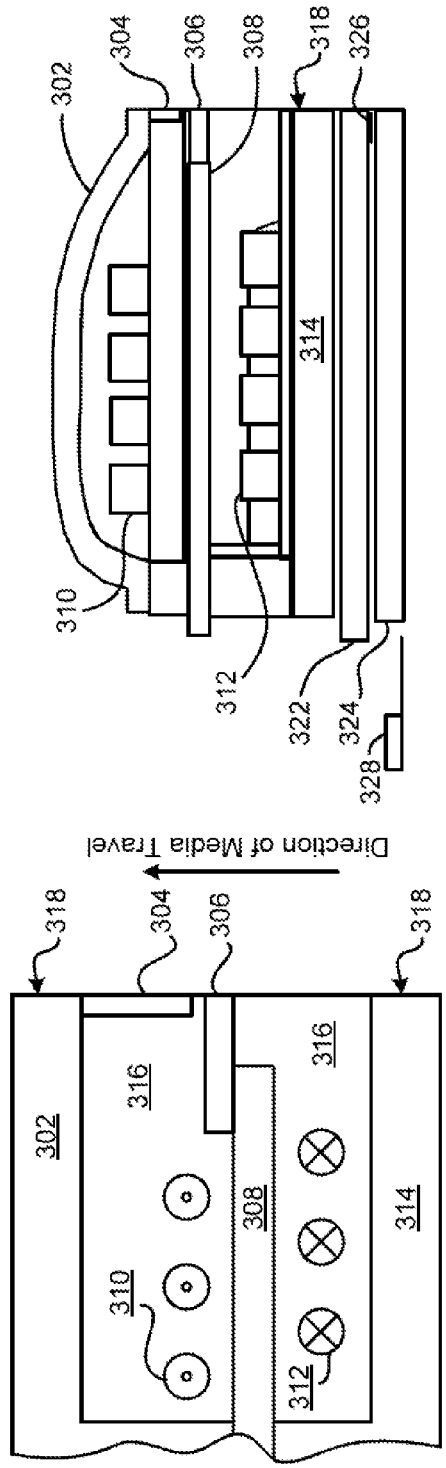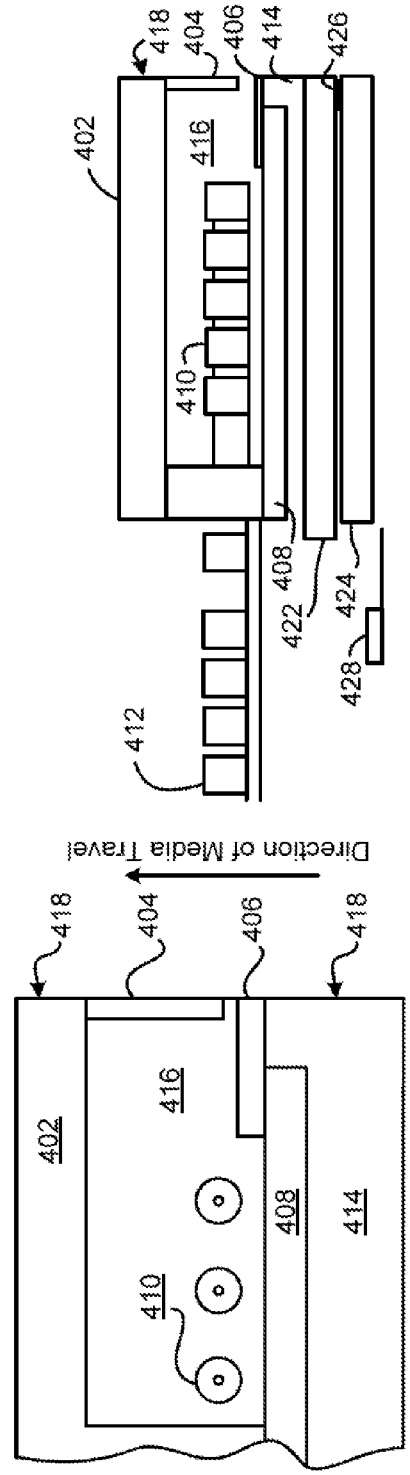

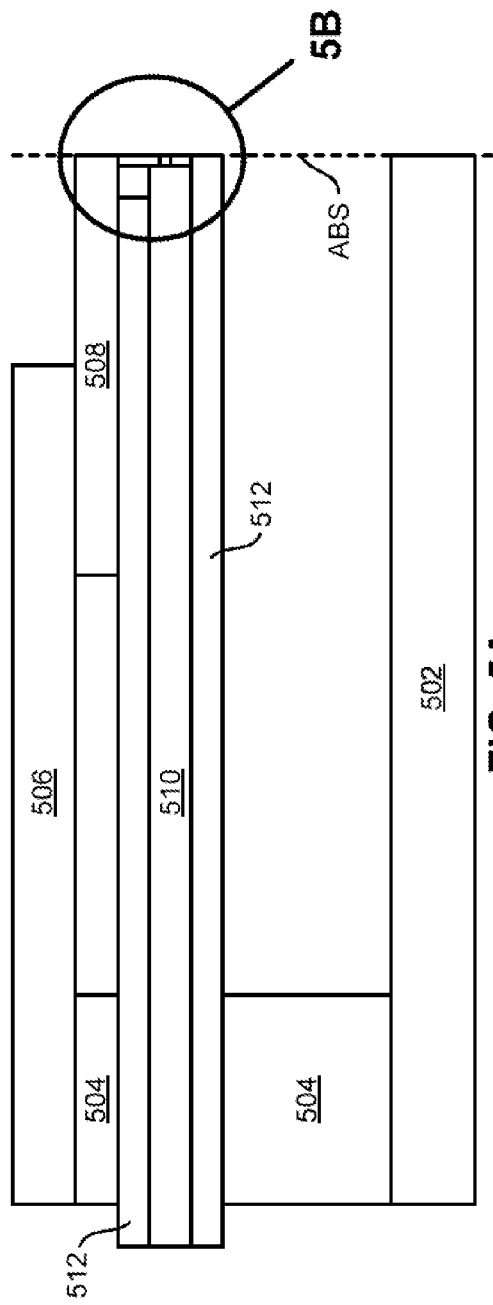
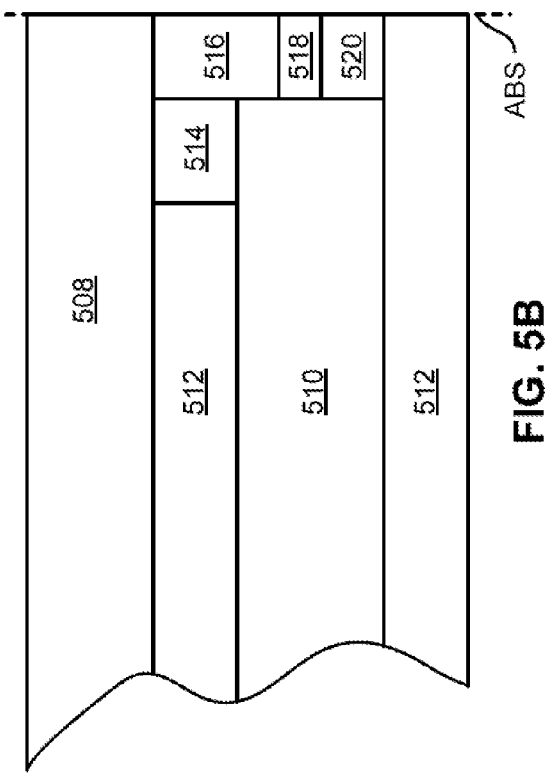

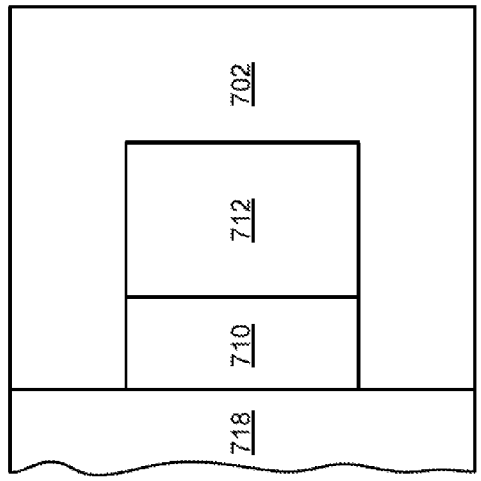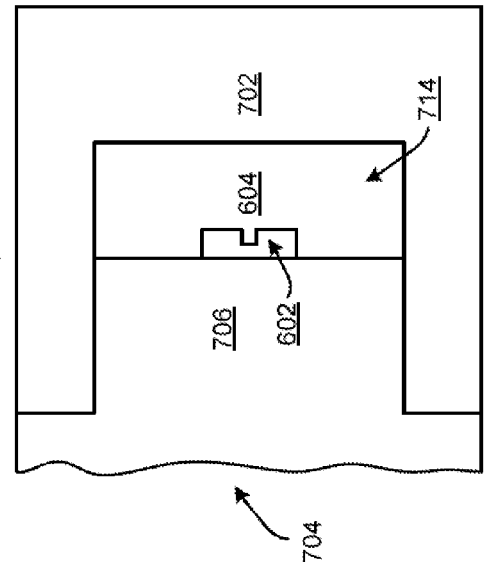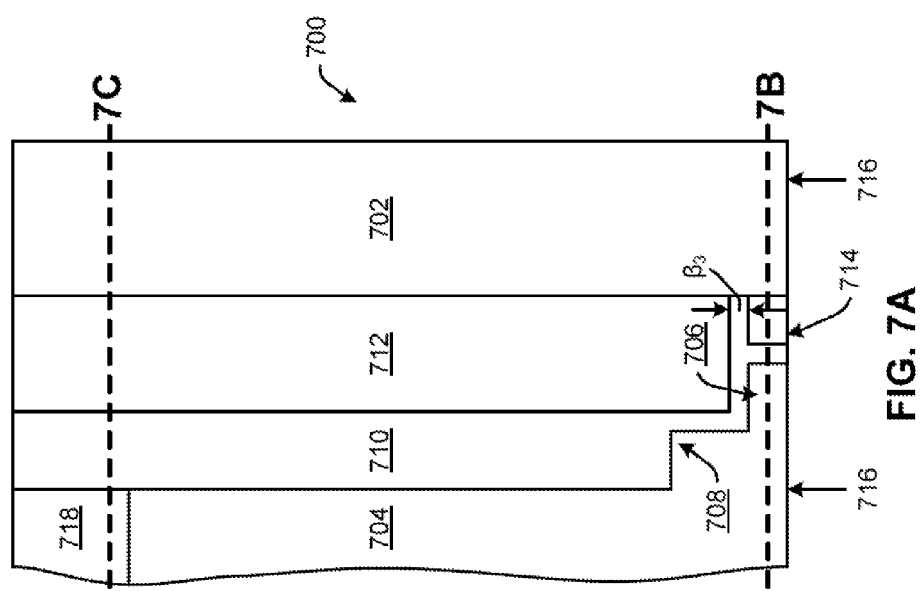

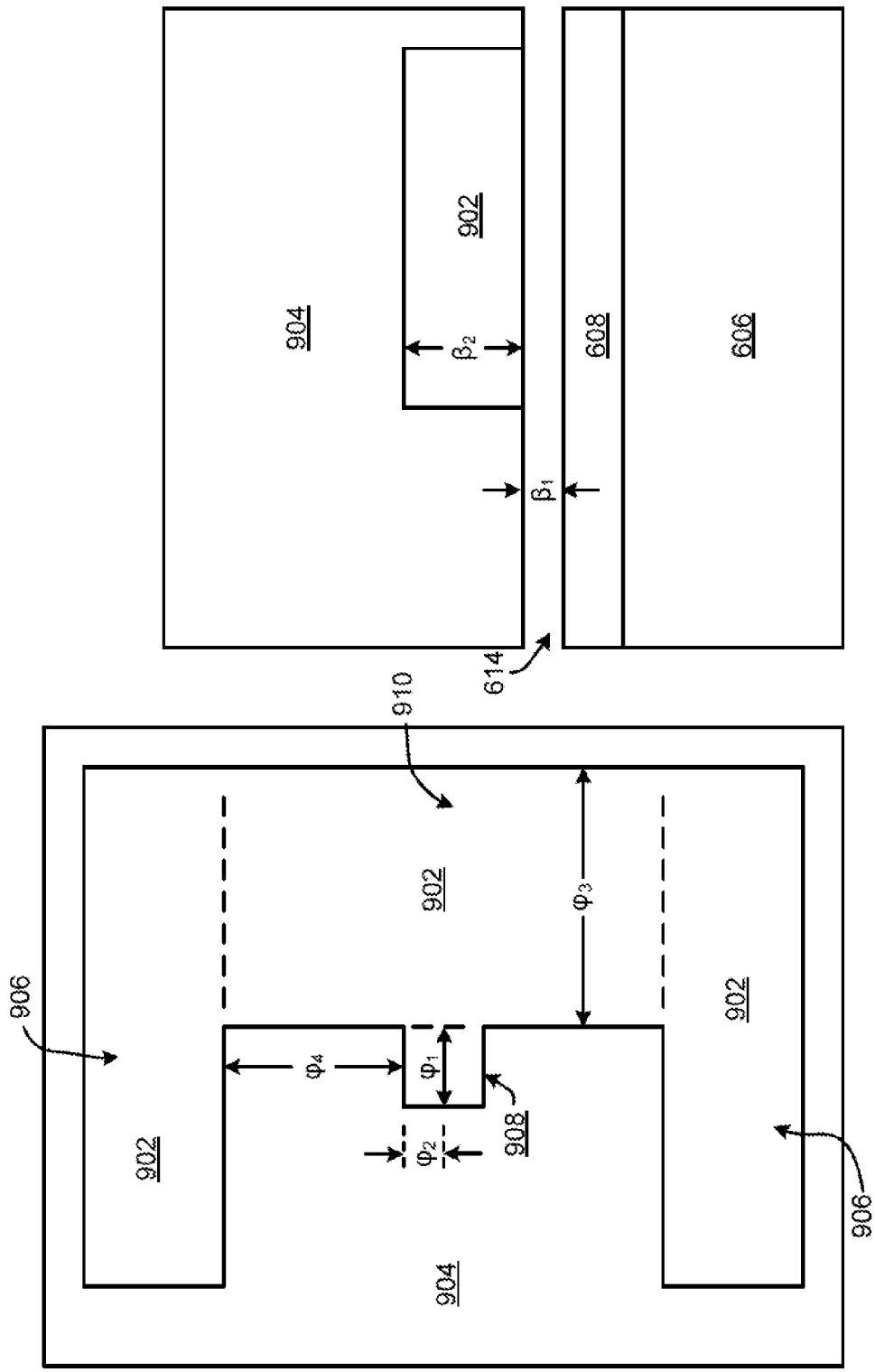

THERMALLY ASSISTED RECORDING HEAD HAVING RECESSED WAVEGUIDE WITH NEAR FIELD TRANSDUCER AND METHODS OF MAKING SAME

RELATED APPLICATIONS

This application is a continuation of U.S. patent application Ser. No. 12/347,084, filed Dec. 31, 2008 now U.S. Pat. No. 8,169,881, and which is herein incorporated by reference.

FIELD OF THE INVENTION

The present invention relates to data storage systems, and more particularly, this invention relates to write heads with near field transducers for thermally assisted recording.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating (in some disk drives, there is a load/unload ramp so contact with the disk does not occur); but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The ongoing quest for higher storage bit densities in magnetic media used in disk drives have reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials, or techniques such as perpendicular recording (or both).

One additional solution has been proposed, which employs heat to lower the effective coercivity of a localized region on the magnetic media surface and writes data within this heated region. The data state becomes "fixed" upon cooling the media to ambient temperatures. This technique is broadly referred to as "thermally assisted (magnetic) recording", TAR or TAMR. It can be applied to both longitudinal or perpendicular recording systems, although the highest density state of the art storage systems are more likely to be perpendicular recording systems. Heating of the media surface has been accomplished by a number of techniques such as focused laser beams or near field optical sources.

U.S. Pat. No. 6,999,384 to Stancil et al., which is herein incorporated by reference, discloses near field heating of a magnetic medium.

What is needed is a way to further improve TAR systems.

SUMMARY OF THE INVENTION

An apparatus according to one embodiment includes a near field transducer comprising a conductive metal film and an optical waveguide for illumination of the near field transducer, a light guiding core layer of the optical waveguide being spaced from the near field transducer by less than about 100 nanometers and greater than 0 nanometers; wherein a longitudinal axis of the optical waveguide is substantially perpendicular to an air bearing surface.

An apparatus according to another embodiment includes a near field transducer comprising a conductive metal film; and an optical waveguide for illumination of the near field transducer, a light guiding core layer of the optical waveguide being spaced from the near field transducer by less than about 100 nanometers, wherein a longitudinal axis of the optical waveguide is substantially perpendicular to an air bearing surface.

A method according to another embodiment includes forming a near field transducer structure having an air bearing surface (ABS) side and a second side opposite the ABS side; forming a cladding layer adjacent the second side of the near field transducer structure, wherein a portion of the cladding layer extends along the near field transducer structure; and forming a core layer adjacent to the portion of the cladding layer extending along the near field transducer structure and above a second portion of the cladding layer, the core layer being separated from the near field transducer via the cladding layer, wherein a longitudinal axis of the core layer is substantially perpendicular to the ABS side of the near field transducer.

A method according to another embodiment includes forming a lower cladding layer; forming a near field transducer structure above the lower cladding layer; forming a second cladding layer adjacent the near field transducer structure and above the lower cladding layer, wherein a portion of the second cladding layer extends along the near field transducer structure; and forming a core layer above the second cladding layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIG. 5A is a partial cross section view of a thin film perpendicular write head design according to one embodiment.

FIG. 5B is a partial cross section expanded view of detail 5B in FIG. 5A, in accordance with one embodiment.

FIG. 7A is a side view of a structure including a near field transducer according to one embodiment.

FIG. 7B is a top view of a lower portion of a structure taken from Line 7B in FIG. 7A according to one embodiment.

FIG. 7C is a top, view of an upper portion of a structure taken from Line 7C in FIG. 7A according to one embodiment.

FIG. 9A is a top view of a near field transducer according to one embodiment.

FIG. 9B is a side view of a structure including a near field transducer according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, an apparatus comprises a near field transducer comprising a conductive metal film having a main body and a ridge extending from the main body; and an optical waveguide for illumination of the near field transducer, a light guiding core layer of the optical waveguide being spaced from the near field transducer by less than about 100 nanometers and greater than 0 nanometers.

In another general embodiment, an apparatus comprises a near field transducer comprising a conductive metal film; and an optical waveguide for illumination of the near field transducer, a light guiding core layer of the optical waveguide being spaced from the near field transducer by less than about 100 nanometers and greater than about 10 nanometers.

In yet another general embodiment, a method comprises forming a near field transducer structure; removing a portion of the near field transducer structure; forming a cladding layer adjacent a remaining portion of the near field transducer structure, wherein a portion of the cladding layer extends along the remaining portion of the near field transducer structure; and forming a core layer above the cladding layer.

In another general embodiment, a method comprises forming a lower cladding layer; forming a near field transducer structure above the lower cladding layer; removing a portion of the near field transducer structure; forming a second cladding layer adjacent a remaining portion of the near field transducer structure and above the lower cladding layer, wherein a portion of the second cladding layer extends along the remaining portion of the near field transducer structure; and forming a core layer above the second cladding layer.

Figure 1:
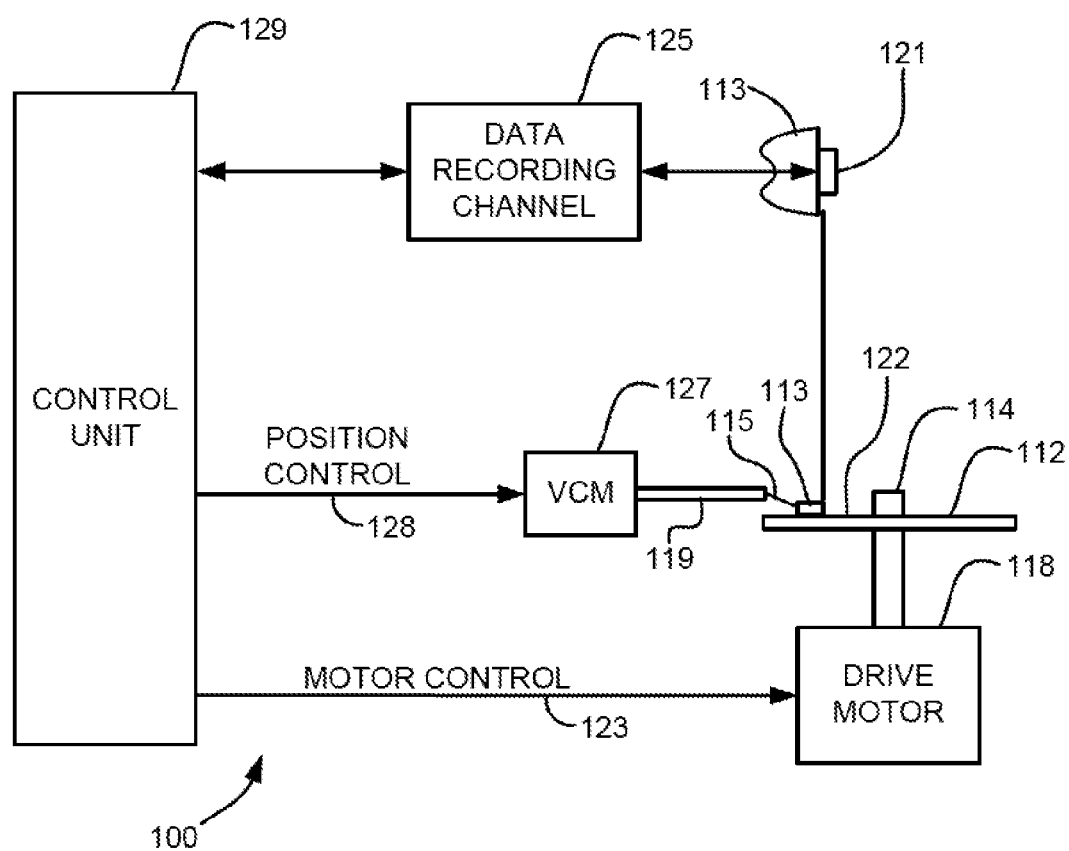
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator an 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2E:
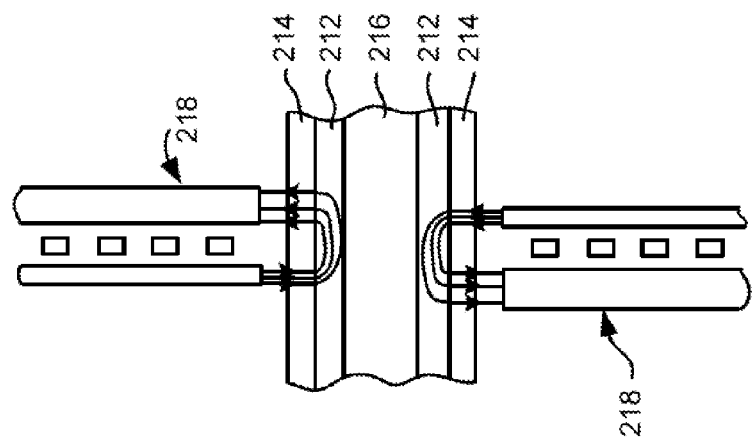
FIG. 2E is a schematic representation of a recording apparatus adapted for recording separately on both sides of the medium.
Figure 2C:
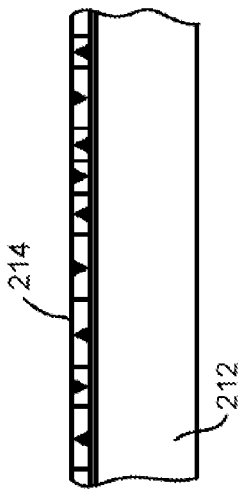
FIG. 2C is a magnetic recording medium utilizing a perpendicular recording format.
Figure 2D:
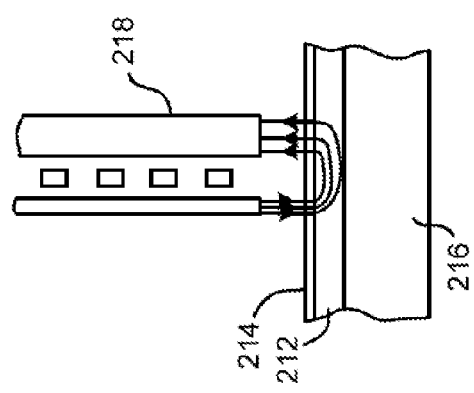
FIG. 2D is a schematic representation of a recording head and recording medium combination for perpendicular recording on one side.
Figure 2A:
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic domains in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
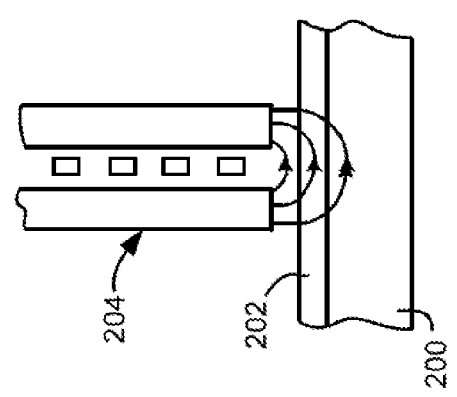
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic domains substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic domains having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including looped coils 410, which loops around to form looped coils 412. Also, sensor shields 422, 424 are shown. The sensor 426 is typically positioned between the sensor shields 422, 424.

In FIGS. 3B and 4B, an optional heater 328, 428, respectively, is shown near the non-ABS side of the magnetic head. A heater 328, 428 may also be included in the magnetic heads shown in FIGS. 3A and 4A. The position of this heater may vary based on design parameters such as where the protrusion is desired, coefficients of thermal expansion of the surrounding layers, etc.

Thermally assisted recording (TAR) is a method of recording information onto a magnetic recording medium, such as a disk, tape, etc. One general motivation for this invention relates to the design of a recessed dielectric waveguide and integration with a near-field optical transducer for TAR. The waveguide core may be optimally recessed by a distance from the transducer and this space may be filled with low index dielectric material leading to significant enhancement of the optical efficiency. In one preferred embodiment, the low index dielectric material in the recessed space may be deposited after fabrication of the near-field transducer using an anisotropic deposition followed by deposition of the high index core material.

According to some embodiments, for TAR to be realized, it may be beneficial to confine heat to about a single data track (an exemplary data track may be approximately 40 nm wide or smaller) with high efficiency. Candidate near-field optical sources typically use a low-loss metal (Au, Ag, Al, Cu, etc.) shaped in such a way as to concentrate surface charge motion at a tip apex located at the slider ABS when light is incident. Oscillating tip charge may create an intense near-field pattern, heating the disk. Sometimes, the metal structure can create resonant charge motion (surface plasmons) to further increase intensity and disk heating. For example, when polarized light is aligned with the corner of a triangular-shaped gold plate, an intense near field pattern may be created at that corner. Resonant charge motion may occur by adjusting the triangle size to match a surface plasmon frequency to the incident light frequency. Another near-field transducer is the ridge slot waveguide from microwave circuits applied to optical frequencies (also known as the C aperture). This shape may be characterized by five parameters including the metal thickness. Light polarization may be aligned with the ridge and incident light may concentrate surface charge at the tip of the ridge.

Previously, a ridge waveguide in silver has been optimized at a wavelength of 516 nm and a metal-to-metal fly-height of 8 nm. Also, far field measurements obtained for various C aperture sizes indicate a spectral shift while narrow resonant behavior has been observed when a pattern of ridges is used to excite surface plasmons around a long slot and enhance far field transmission. The majority of embodiments described herein relate to using a ridge waveguide of some kind to enhance the writing capabilities in TAR.

U.S. Pat. No. 6,999,384 to Stancil et al., incorporated by reference above, describes the phenomenon of near field heating of a magnetic medium in more detail.

Now referring to FIG. 5A, a partial cross section view 500 of a thin film perpendicular write head design incorporating an integrated aperture near field optical source is shown according to one embodiment. Of course, this embodiment may be used in conjunction with any structures and systems described in any of the other figures. In order to simplify and clarify the structures presented, spacing layers, insulating layers, and write coil layers may be omitted from the subsequent figures and descriptions.

With continued reference to FIG. 5A, the write head comprises lower return pole layer 502, back-gap layer(s) 504, upper return pole layer 506, and upper pole tip layer 508. Lower return pole layer 502 may also have a lower pole tip (not shown) at the ABS. Layer 510 is an optical waveguide core, surrounded by cladding layers 512 according to some embodiments. Layers 510 and 512 may extend through at least a portion of back-gap layer(s) 504. The components inside of Circle 5B are shown in an expanded view in FIG. 5B. Coil layers (not shown) and various insulating and spacer layers (not shown) might reside in the cavity bounded by the ABS, back-gap(s) 504, lower return pole 502, and upper bounding layers 506, 508, and 512 as would be recognized by those of skill in the art. Layers 502, 504, 506, and 508 may be comprised of a suitable magnetic alloy or material, as would be known by one of reasonable skill in the relevant art. Exemplary materials include Co, Ni, and/or Fe and combinations thereof. Layer 510 may be comprised of a suitable light transmitting material, as would be known by one of reasonable skill in the relevant art. Exemplary materials preferably include $Ta_2O_5$, and/or $TiO_2$. As shown, the core layer 510 has approximately uniform cross section along its length. As well known in the art, the optical waveguide can have a number of other possible designs including a planar solid immersion mirror or planar solid immersion lens which have a non-uniform core cross section along the waveguide's length.

FIG. 5B is a partial cross section expanded view of detail 5B in FIG. 5A, in accordance with one embodiment. Pole lip 516 is magnetically coupled to upper pole tip layer 508, and to optional magnetic step layer 514. Aperture 518 (also known as a ridge aperture), surrounding metal layer 520, and pole lip 516 comprise the near field aperture optical source (or near field transducer), which is supplied optical energy via optical waveguide core 510. Pole lip 516 and optional magnetic step layer 514 may be comprised of a suitable magnetic alloy, such as Co, Fe, Ni, and/or combinations thereof. Metal layer 520 may be comprised of Cu, Au, Ag, and/or alloys thereof, etc.

With continued reference to FIG. 5B, cladding layer 512 thickness may be nominally about 200 nm, but may be thicker or thinner depending on the dimensions of other layers in the structure. Optional magnetic step layer 514 may have a nominal thickness (the dimension between layers 508 and 510) of about 150 nm, and a nominal depth (as measured from layer 516 to layer 512) of about 180 nm. Pole lip 516 may have a nominal depth (as measured from the ABS) approximately equal to that of layer 520, with the value being determined by the performance and properties of the near field optical source (see examples below). The thickness of the pole lip 516 can vary from about 150 nm (with the optional magnetic step layer 514) to about 1 micron, preferably between about 250 nm and about 350 nm. The thickness of optical waveguide core layer 510 may be nominally between about 200 nm and about 400 nm, sufficient to cover the thickness of the aperture 518 (see FIG. 6A).

Figure 6B:
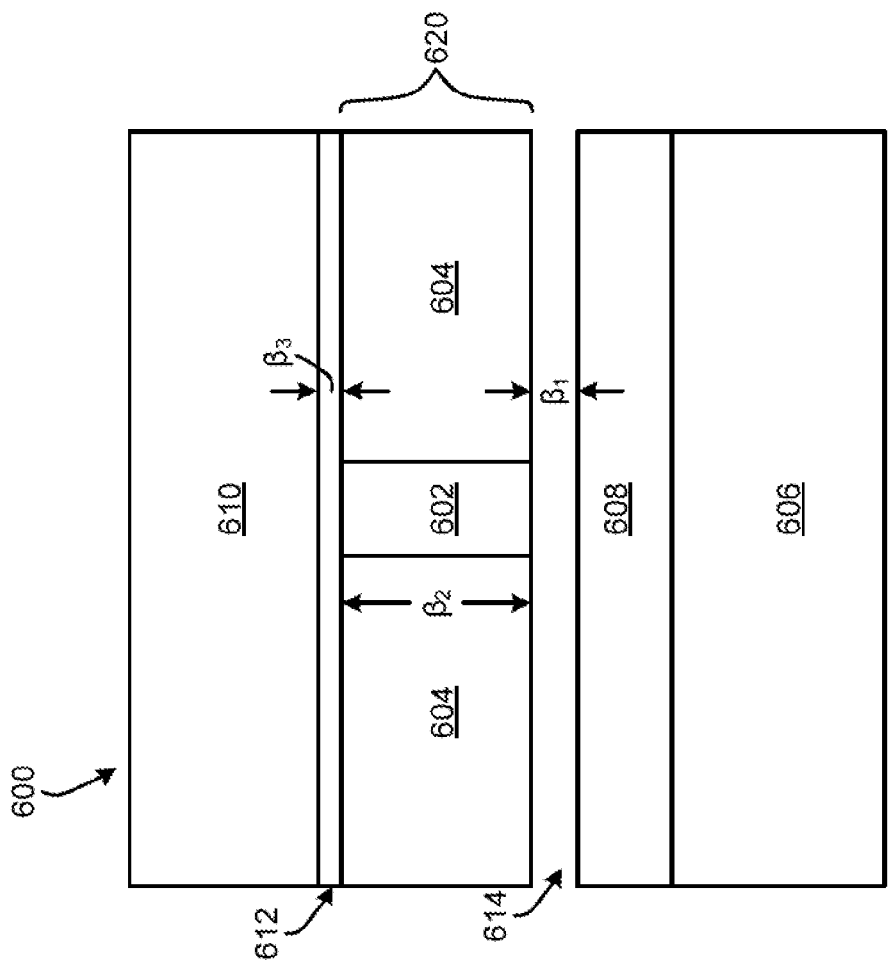
FIG. 6B is a side view of a structure including a near field transducer according to one embodiment.
Figure 6A:
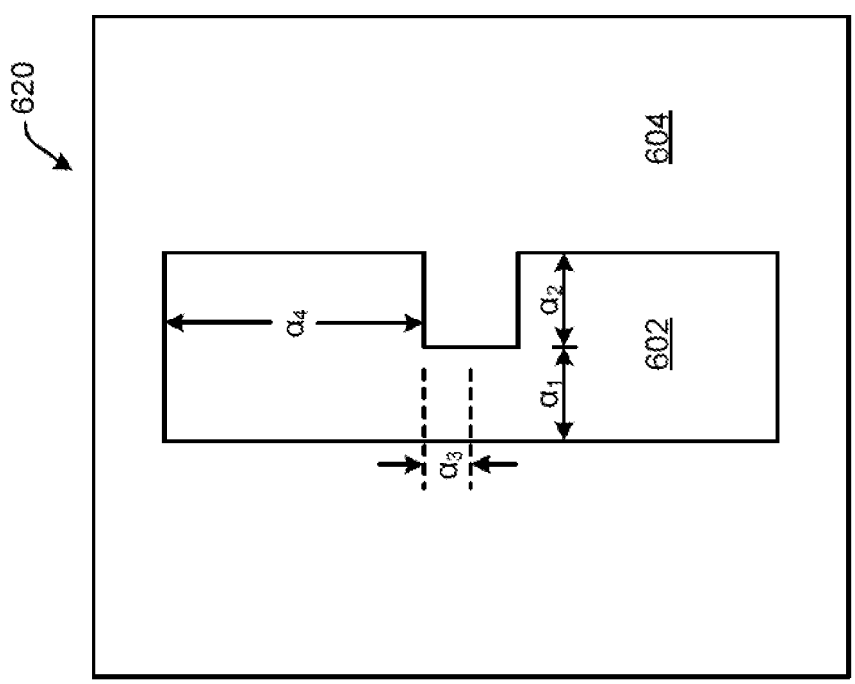
FIG. 6A is a top view of a near field transducer according to one embodiment.

Now referring to FIG. 6A, a top view of a near field transducer 620 is shown according to one embodiment. Of course, this embodiment may be used in conjunction with any structures and systems described in any of the other figures, such as FIGS. 1-5B. FIG. 6A is a top view of the near field transducer 620 while FIG. 6B is a side view of a structure 600 including the near field transducer 620.

As shown in FIG. 6A, a near field transducer 620, which may include a C aperture 602, is included in the structure (600, FIG. 6B), and may be described as a plasmonic device with a field enhancing ridge. The C aperture 602 may be surrounded by a conductive metal film 604, and both of these components together may comprise the near field transducer 620, which may comprise metal film 604 having a main body and a ridge extending from the main body. In some embodiments, the conductive metal film 604 may be generally non-triangular in shape.

In some embodiments, the metal film 604 may further comprise wings extending from the main body. Further, a layer of magnetic material may extend at least a portion of a distance between the wings. Note that the conductive metal film 604 may be formed of various layers, and is not necessarily a unitarily-formed film.

The C aperture 602 may isolate the ridge on three sides, and may be comprised of $SiO_2$, $Al_2O_3$, or any other suitable material as would be known to one of reasonable skill in the relevant art. The conductive metal film 604 may be comprised of Au, Cu, Ag, and/or combinations thereof, etc., or any other suitable material as would be known to one of reasonable skill in the relevant art.

In some other embodiments, the metal film 604 may have an E-antenna (described in FIGS. 9A and 9B) formed therein in place of the C aperture.

The values of the several dimensions indicated in FIG. 6A may be adjusted according to specific needs of the application, and the following dimensions are for example only, and in no way limit the scope of the invention. Each dimension may be larger or smaller depending on the dimensions of other layers in the structure 600. In some embodiments, the length of $\alpha_1$ may be about equal to the length of $\alpha_2$. Also, in some embodiments, the length of $\alpha_1$ and/or $\alpha_2$ may be preferably between about 10 nm and about 50 nm, for example about 30 nm.

In some embodiments, the length of $\alpha_3$ may be preferably between about 10 nm and about 50 nm, for example about 15 nm, and in some further embodiments, the length of $\alpha_3$ may be about equal to half of the length of $\alpha_1$ and/or $\alpha_2$.

In some embodiments, the length of $\alpha_4$ may be preferably between about 60 nm and about 250 nm, for example about 130 nm.

In FIG. 6B, a side view of the structure 600 is shown according to one embodiment. The C aperture 602 may be surrounded by a conductive metal film 604. The height $\beta_2$ of the C aperture 602 may be between about 30 nm and about 300 nm, and may be set according to a relationship with the wavelength of a light. Above the C aperture 602, a core layer 610 may be formed of $TiO_2$, $Ta_2O_5$, etc., or any other suitable material as would be known to one of reasonable skill in the relevant art. The core layer 610 may be insulated from the C aperture 602 by a thin layer of material forming a recess 612, comprised of a low index material like $Al_2O_3$, $SiO_2$, etc. In some embodiments, the recess 612 and the C aperture 602 may be comprised of the same material. In general, a low index material can be any material having an index below about 1.75.

In some embodiments, the near field transducer 620 may be separated from the optical waveguide, which may include the core layer 610 and surrounding cladding layers, by a recess 612 having a thickness $\beta_3$ of greater than about 0 nm and less than or equal to about 100 nm. In other approaches, the optical waveguide may be spaced from the near field transducer 620 by between about 100 nm and about 10 nm, by between about 80 nm and about 10 nm, by between about 60 nm and about 10 nm, by between about 100 nm and about 20 nm, by between about 100 nm and about 40 nm, etc.

With continued reference to FIG. 6B, an air gap 614 may be present below the near field transducer 620, with a thickness $\beta_1$ of between about 1 nm and about 50 nm, which may act as a gap between the head and a disk surface, including a recording layer 608. The recording layer 608 may be formed of any suitable material as would be known to one of reasonable skill in the relevant art, such as CoPt or FePt. Below the recording layer 608, a heatsink 606 may be formed, as would be known to one of reasonable skill in the relevant art.

Other layers and combinations of layers may be used in the structure 600 or the disk as would be used by one of ordinary skill in the relevant art, including insulating layers, adhesive layers, etc. In addition, any of the layers described in relation to structure 600 may be comprised of multiple layers, which may or may not be of the same material.

Now referring to FIG. 7A, a cross section taken from the middle of another structure 700 is shown according to one embodiment. The structure 700 may be a magnetic head with near field transducer 714, possibly including a C aperture or E-antenna 602, comprising a conductive metal film (604, FIG. 7B), and an integrated waveguide, possibly for illumination of the near field transducer 714, with a light guiding core layer 712 of the optical waveguide being spaced from the near field transducer 714 by a distance $\beta_3$. Of course, this embodiment may be used in conjunction with any structures and systems described in FIGS. 1-6B. The structure may include a main pole 704 which may be comprised of any material as would be known to one of reasonable skill in the relevant art, such as NiFe, CoFe, CoNiFe, etc. The main pole 704 may have a step 708 formed near the lower portion of the main pole 704. In addition, the main pole 704 may have a lip 706 formed near the ABS 716.

In some embodiments, the distance $\beta_3$ may be less than about 100 nm and greater than about 10 nm. In other approaches, the optical waveguide may be spaced from the near field transducer 714 by between about 80 nm and about 10 nm, by between about 60 nm and about 10 nm, by between about 100 nm and about 20 nm, by between about 100 nm and about 40 nm, etc.

Next to the main pole 704, a lower cladding layer 710 may be formed which may isolate the main pole 704 from light propagating in core layer 712. The lower cladding layer 710 may be formed of any low index, isolating material as would be known to one of ordinary skill in the relevant art, such as $Al_2O_3$, $SiO_2$, etc. The gap or aperture between metal film (604, FIG. 7B) and magnetic lip 706 may be filled with any optically transparent or nearly transparent material such as $SiO_2$, $Al_2O_3$, etc., as is well known to those skilled in the art.

In addition, the isolating layer may form a thin layer between the near field transducer 714 and the core layer 712 of the optical waveguide, forming a recess between the near field transducer 714 and the core layer 712. This separation of the near field transducer 714 from the core layer 712 causes the optical efficiency of the structure 700 to significantly improve.

The core layer 712 is generally used to deliver light energy to a disk surface, thereby inducing isolated heating of the disk surface. The core layer 712 may be comprised of any high index material, such as $TiO_2$, $Ta_2O_5$, etc., or any other material as would be known by one of ordinary skill in the relevant art. On top of core layer 712, a top cladding layer 702 may be formed, from any material as would be known to one of ordinary skill in the relevant art, such as $Al_2O_3$, $SiO_2$, etc. In addition, a cladding layer 718 may be formed above the main pole 704. The lower cladding layer 710 may also form a recess between the optical waveguide and the near field transducer 714, according to some embodiments.

FIG. 7B shows an ABS view taken from Line 7B in FIG. 7A of the structure 700 according to one embodiment. As shown, the main pole 704 may form a magnetic lip 706 that extends toward the near field transducer 714. The aperture 602 may be surrounded on three sides by a conductive metal film 604, such as Au, Ag, Cu, etc. The notch in the aperture 602 may also be filled with the conductive metal film 604. The three sides of the metal film 604 which is not in contact with the magnetic lip 706 may be adjacent to the cladding layer 702.

Typically, a near field transducer optical source consists of a rectangular shaped aperture placed in an electrically conductive metal film. In some embodiments, the near field transducer may be a C aperture or E-antenna. Light of the appropriate frequency is directed onto the aperture/antenna and the surrounding metal film.

In the present embodiment, light is directed to the near field transducer 714 which comprises the C aperture 602 and surrounding metal film 604, via optical waveguide core layer 712. Extending into the center portion of the C aperture 602 is an electrically conductive ridge, generally an extension of the surrounding metal film 604. Incident radiation, polarized in the direction parallel to the ridge produces a near-field light source which appears close to or at the end of the ridge, in the gap between the end of the ridge and the opposing boundary of the aperture 602. In the present embodiment, magnetic lip 706 is located at this opposing boundary, placing the near field light source in close proximity to the magnetic lip 706.

Note that magnetic lip 706 makes up an integral component to the metallic region surrounding the C aperture 602. In near field light sources of conventional construction, the entire metallic region surrounding the C aperture is comprised of highly conductive metals such as Cu, Ag, or Au. Prior art modeling studies of the conventional C aperture indicated that a highly conductive metal was required to optimize light output of the near field source, and it has been assumed that the entire metal region surrounding C aperture needed to be comprised of a highly conductive material. This generally required that any pole material be placed outside the conductive region surrounding the aperture, limiting the proximity of optical heat source to the pole tip, precluding the use of dual gradient recording. Studies performed in the development of the present embodiment have uncovered the unexpected development that a magnetic lip 706 of approximately the same height as transducer material 604, can be substituted for a portion of the highly conductive layer 604 surrounding the C aperture 602, with minimal impact on the optical efficiency, provided that the magnetic lip 706 borders aperture 602, and is located across from the end of the ridge. This locates the effective pole tip of the write head at very close proximity to the thermal region generated by a near field light source, which is located between the end of the ridge and the edge of magnetic lip 706.

FIG. 7C shows a cross section view taken from Line 7C in FIG. 7A of the structure 700 according to one embodiment. As shown at this position away from the ABS 716, the structure 700 may be generally referred to as an optical waveguide. A cladding layer 702 may surround three sides of a structure formed of the isolating layer 710 and the core layer 712, while another cladding layer 718 may be formed on the remaining side. The core layer 712 may have a rectangular cross section, or any other cross sectional profile as selected by one of ordinary skill in the relevant art, such as square, triangular, circular, etc. Other waveguide structures may also be used, such as solid immersion mirrors, solid immersion lenses, etc.

In each of FIGS. 7A-7C, the left most portion of the figure may extend further and may form more shapes and may include additional layers. Also, other layers and combinations of layers may be used in the structure 700 as would be used by one of ordinary skill in the relevant art, including insulating layers, adhesive layers, etc. In addition, any of the layers described in relation to structure 700 may be comprised of multiple layers, which may or may not be of the same material.

Figure 7E:
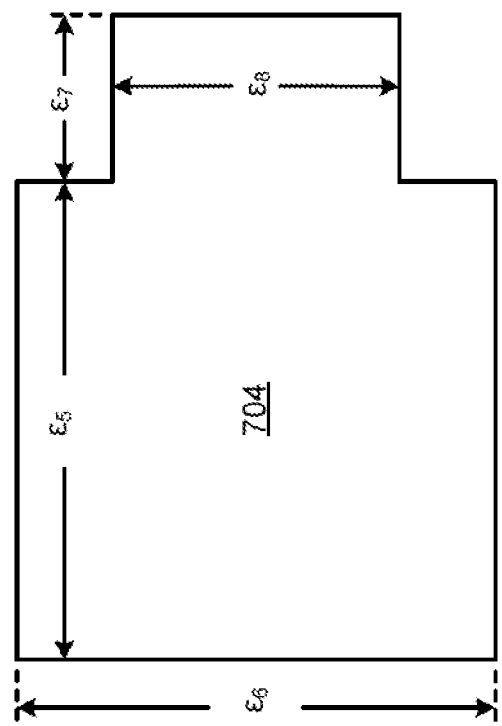
FIG. 7E is a top view of a main pole according to one embodiment.
Figure 7D:
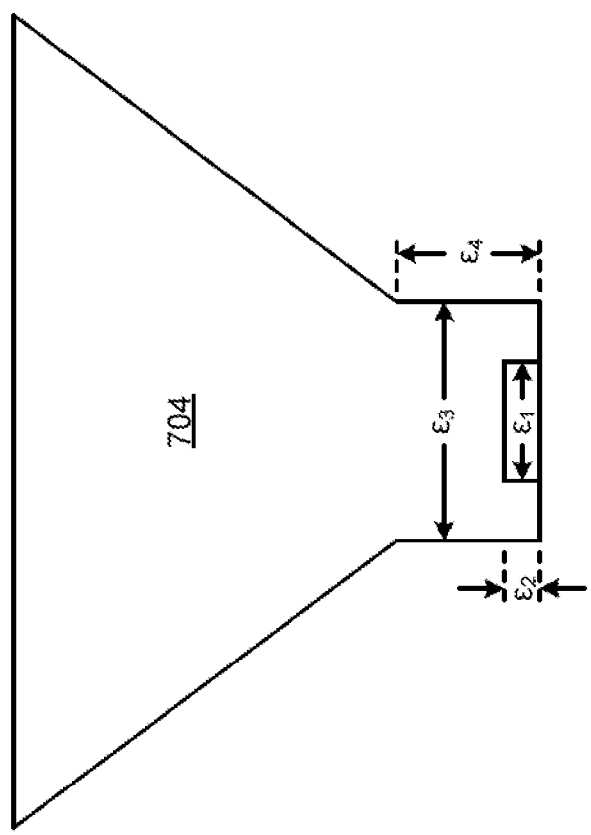
FIG. 7D is a trailing view of a main pole according to one embodiment.

Now referring to FIG. 7D, a trailing view is shown of the main pole 704 according to one embodiment. As shown, the main pole 704 may taper outwardly from a lower portion. The height dimension $\epsilon_4$ indicates the height of the step (708, FIG. 7A), which may be between about 100 and about 1000 nm, preferably about 500 nm. The height dimension $\epsilon_2$ indicates the height of the pole lip (706, FIG. 7A), which may be between about 20 nm and about 200 nm, preferably about 90 nm. In addition, the width dimension $\epsilon_3$ indicates the width of the step (708, FIG. 7A), which may be between about 200 nm and about 2000 nm, preferably about 1000 nm. The width dimension $\epsilon_1$ indicates the width of the pole lip (706, FIG. 7A), which may be between about 100 nm and about 1000 nm, preferably about 600 nm.

Now referring to FIG. 7E, a partial ABS view of the main pole 704 is shown according to one embodiment. As can be seen, the main pole 704 may have a narrower portion and a thicker portion. According to some embodiments, the dimensions, $\epsilon_5$ and $\epsilon_6$ may be about equal. In addition, the dimensions $\epsilon_5$ and $\epsilon_6$ may be between about 200 and 2000 nm, preferably about 1000 nm. The dimension $\epsilon_7$ may be between about 70 nm and about 700 nm, preferably about 350 nm. The dimension $\epsilon_8$ may be between about 100 nm and about 1000 nm, preferably about 600 nm.

Each of the dimensions described in regard to FIGS. 7D and 7E or any other embodiment, may be more or less, depending on the particular sizes and shapes of components in the head and system.

Figure 8A:
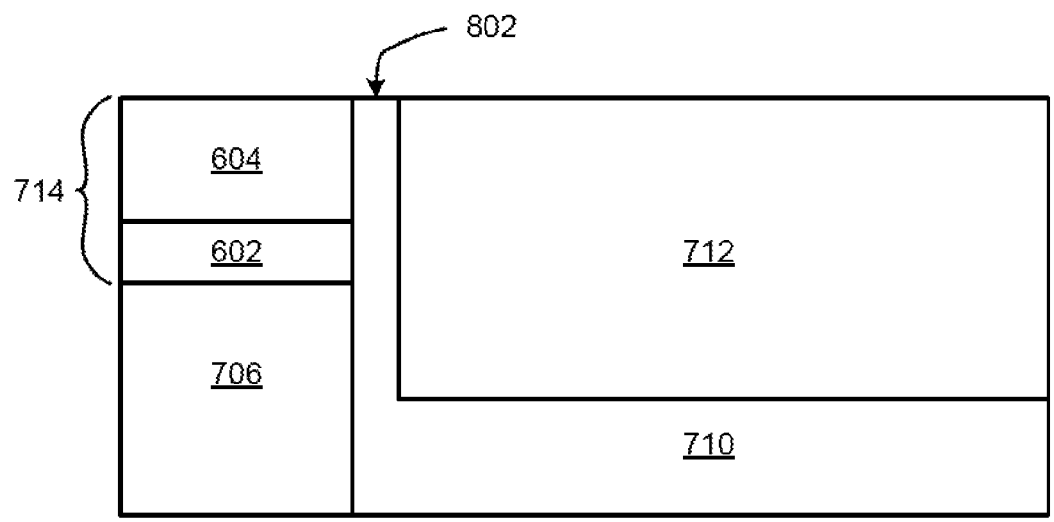
FIG. 8A is a side view of a structure including a near field transducer according to one embodiment.
Figure 8B:
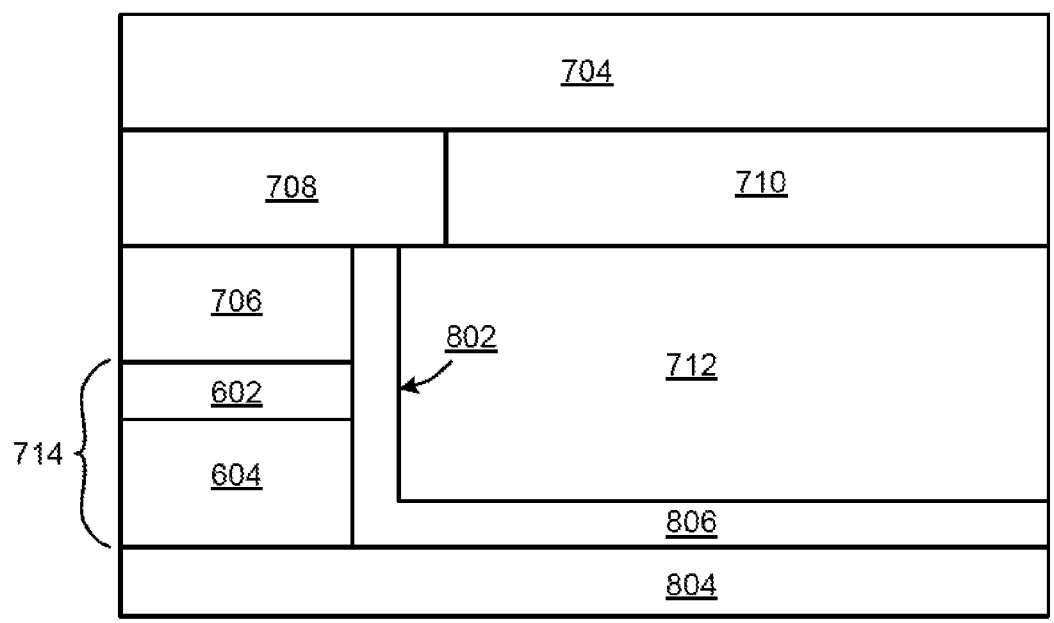
FIG. 8B is a side view of a structure including a near field transducer according to one embodiment.

FIGS. 8A and 8B show two alternate structures which have a recess 802 which may isolate the core layer 712 from the near field transducer 714 according to specific embodiments. Of course, these embodiments may be used in conjunction with any structures and systems described in FIGS. 1-7E. In FIG. 8A, the magnetic lip 706 and the near field transducer 714, which in this embodiment comprises the conductive metal film 604 and the aperture 602, may be formed before the cladding layer 710, and then etched or ion milled to form a back wall. The recess 802 may then be formed as a single, continuous cladding layer 710, possibly through anisotropic deposition of the lower cladding material to form the cladding layer 710, followed by deposition of the core material to form the core layer 712. Chemical-mechanical polishing (CMP) may be used to planarize the structure and may remove cladding and core material above the near field transducer 714.

In FIG. 8B, the recess 802 may be formed of a cladding layer 806 which may be a separate layer from the lower cladding layer 804. In this embodiment, the majority of the lower cladding layer 804 may be formed, and the near field transducer 714, which in this embodiment comprises the conductive metal film 604 and the aperture 602, may be formed above the lower cladding layer 804. The magnetic lip 706 is formed on top of the near field transducer 714. The near field transducer 714 and magnetic lip 706 may then be etched or ion milled to form a back wall, and then the cladding layer 806 may be formed, possibly through isotropic deposition of additional cladding material, after the near field transducer 714 and magnetic lip 706 is formed. Then the core layer 712 may be formed, possibly through deposition of core material, followed by CMP to planarize the structure and remove cladding and core material above the transducer.

Also included in the structure in FIG. 8B is the pole step 708, and pole 704, which may be formed of the same magnetic material in one or several processing steps. Between the pole step 708 and the core layer 712, a top cladding layer 710 may be formed.

In some embodiments, at least one cladding layer 806 may be positioned between the core layer 712 and the near field transducer 714. Further, at least one of the cladding layers 806 may be directly adjacent a side of the core layer 712 extending parallel to an axis of the core layer 712 and a side of the core layer 712 extending perpendicular to the axis of the core layer 712. Also, at least one of the cladding layers 804 may extend below the near field transducer 714, as shown in FIG. 8B.

Now, with reference to FIG. 8A, a method is described for forming a structure. The method comprises forming a near field transducer 714 structure. A portion of the near field transducer 714 may be removed, through etching or ion milling or some other technique known to one of skill in the relevant art. Once the back wall of the near field transducer 714 is formed, a cladding layer 710 may be formed adjacent to a remaining portion of the near field transducer 714 structure, wherein a portion of the cladding layer 710 may extend along the remaining portion of the near field transducer 714 structure. Now, a core layer 712 may be formed above the cladding layer 710.

In some embodiments, the near field transducer 714 may have a C aperture 602 formed therein. In other embodiments, the near field transducer 714 may have an E antenna (described below) formed therein.

In some embodiments, the method includes forming a cladding layer which may enclose the core layer 712, and at least one cladding layers may be positioned between the core layer 712 and the near field transducer 714.

In some additional embodiments, as shown in FIG. 8B, a cladding layer 804 may extend below the near field transducer 714. In addition, the core layer 712 may be positioned above two cladding layers 804, 806.

In some embodiments, at least a portion of the near field transducer 714 may include magnetic material, such as Fe, Ni, Co, and/or combinations thereof, etc.

FIGS. 9A and 9B show an alternative embodiment called an E-Antenna 902. Of course, this embodiment may be used in conjunction with any structures and systems described in FIGS. 1-8B. The E-Antenna 902 may act as a plasmonic device with a field enhancing ridge 908, similar to the C aperture described earlier. The E-Antenna 902 is comprised of four sections, separated by dashed lines in FIG. 9A: a body section 910, two wing sections 906, and a notch section 908. Each of these sections may be formed in a single process, or may be formed separately and then connected. The E-Antenna 902 may be comprised of any low loss metal such as Au, Cu, Ag, etc., as is known to one of ordinary skill in the relevant art. In particular, the body 910 and notch 908 may preferably be comprised of Au, Cu, Ag, and/or combinations thereof. A dielectric layer 904 may surround the E-antenna 902, and may be comprised of any suitable material as would be known to one of reasonable skill in the relevant art, such as $SiO_2$.

In FIG. 9A, four dimensions are shown. Dimension $\phi_1$ may be between about 5 nm and about 50 nm, preferably about 30 nm. Dimension $\phi_2$ may be about half of dimension $\phi_1$, and in some embodiments, dimension $\phi_2$ may between about 5 nm and about 50 nm. Dimension $\phi_3$ may be between about 25 nm and about 250 nm, preferably about 125 nm. In some embodiments, dimension $\phi_3$ and dimension $\phi_4$ may be about equal. In some embodiments, dimension $\phi_4$ may be between about 25 nm and about 250 nm, preferably about 125 nm. The wing sections 906 should be large enough to act as a charge reservoir for the plasmon formed in the body.

Now referring to FIG. 9B, a side view of the E-antenna 902 is shown according to one embodiment. The E-antenna may have a thickness $\beta_2$ of between about 30 nm and about 300 nm, and may be set according to a relationship with the wavelength of a light. An air gap 614 may be formed below the E-antenna 902, with a thickness $\beta_1$ of between about 1 nm and about 50 nm, which may act as a gap between the head and a disk surface, including a recording layer 608. Below the air gap 614, a recording layer 608 may be formed of any suitable high magnetic anisotropy material as would be known to one of reasonable skill in the relevant art, such as CoPt or FePt. Below the recording layer 608, a heatsink 606 may be formed, as would be known to one of reasonable skill in the relevant art. As shown in FIG. 9B, the dielectric layer 904 may fill in the void spaces around the E-antenna 902.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
 a near field transducer comprising a conductive metal film; and
 an optical waveguide for illumination of the near field transducer, a light guiding core layer of the optical waveguide being spaced from the near field transducer by less than about 100 nanometers and greater than 0 nanometers,
 wherein a longitudinal axis of the optical waveguide is substantially perpendicular to an air bearing surface.

2. The apparatus as recited in claim 1, wherein the conductive metal film has a C aperture formed therein.

3. The apparatus as recited in claim 1, wherein the conductive metal film has an E shape.

4. The apparatus as recited in claim 1, wherein the conductive metal film includes wings extending from the main body.

5. The apparatus as recited in claim 4, further comprising a layer of magnetic material extending at least a portion of a distance between the wings.

6. The apparatus as recited in claim 1, wherein the conductive metal film is generally non-triangular.

7. The apparatus as recited in claim 1, wherein the optical waveguide further comprises cladding layers enclosing the core layer.

8. The apparatus as recited in claim 7, wherein at least one of the cladding layers is positioned in a location selected from a group consisting of between the core layer and the near field transducer, and below the near field transducer.

9. The apparatus as recited in claim 8, wherein the at least one of the cladding layers is directly adjacent a side of the core layer extending parallel to an axis of the core layer and a side of the core layer extending perpendicular to the axis of the core layer.

10. The apparatus as recited in claim 1, wherein at least a portion of the near field transducer is positioned between the air bearing surface and the core layer.

11. The apparatus as recited in claim 1, further comprising:
 a magnetic head, the near field transducer being in the magnetic head;
 a magnetic medium;
 a drive mechanism for passing the magnetic medium over the magnetic head; and
 a controller electrically coupled to the magnetic head for controlling operation of the magnetic head.

12. An apparatus, comprising:
 a near field transducer comprising a conductive metal film;
 an optical waveguide for illumination of the near field transducer, a light guiding core layer of the optical waveguide being spaced from the near field transducer by less than about 100 nanometers, wherein a longitudinal axis of the optical waveguide is substantially perpendicular to an air bearing surface;
 a magnetic head, the near field transducer being in the magnetic head;
 a magnetic medium;
 a drive mechanism for passing the magnetic medium over the magnetic head; and a controller electrically coupled to the magnetic head for controlling operation of the magnetic head.

13. The apparatus as recited in claim 12, wherein the conductive metal film has at least one of a C aperture formed therein and an E shape.

14. The apparatus as recited in claim 12, wherein at least a portion of the near field transducer is positioned between the air bearing surface and the core layer.

15. The apparatus as recited in claim 12, wherein the optical waveguide further comprises cladding layers enclosing the core layer, wherein at least one of the cladding layers is the layer positioned between the core layer and the near field transducer.

16. The apparatus as recited in claim 15, wherein the optical waveguide further comprises cladding layers enclosing the core layer, wherein the core layer is above two cladding layers.

17. A method, comprising:
  forming a near field transducer structure having an air bearing surface (ABS) side and a second side opposite the ABS side;
  forming a cladding layer adjacent the second side of the near field transducer structure, wherein a portion of the cladding layer extends along the near field transducer structure; and
  forming a core layer adjacent to the portion of the cladding layer extending along the near field transducer structure and above a second portion of the cladding layer, the core layer being separated from the near field transducer via the cladding layer,
  wherein a longitudinal axis of the core layer is substantially perpendicular to the ABS side of the near field transducer.

18. The method as recited in claim 17, wherein the near field transducer structure has at least one of a C aperture formed therein and an E shape.

19. The method as recited in claim 17, wherein at least a portion of the near field transducer is positioned between the air bearing surface and the core layer.

20. The method as recited in claim 17, wherein at least a portion of the near field transducer structure includes a magnetic material.

21. A method, comprising:
  forming a lower cladding layer;
  forming a near field transducer structure above the lower cladding layer;
  forming a second cladding layer adjacent the near field transducer structure and above the lower cladding layer, wherein a portion of the second cladding layer extends along the near field transducer structure; and
  forming a core layer above the second cladding layer.

22. The method as recited in claim 21, wherein the near field transducer structure has a C aperture formed therein, wherein a longitudinal axis of the core layer is substantially perpendicular to an ABS side of the near field transducer.

23. The method as recited in claim 21, wherein the near field transducer structure includes a conductive metal film having an E shape.

\* \* \* \* \*

UNITED STATES PATENT AND TRADEMARK OFFICE
CERTIFICATE OF CORRECTION

| | | |
|---|---|---|
| PATENT NO. | : 8,619,535 B2 | Page 1 of 1 |
| APPLICATION NO. | : 13/438811 | |
| DATED | : December 31, 2013 | |
| INVENTOR(S) | : Balamane et al. | |

It is certified that error appears in the above-identified patent and that said Letters Patent is hereby corrected as shown below:

In the specification:

col. 4, line 41 replace "an 119" with --arm 119--.

Signed and Sealed this
Eleventh Day of March, 2014

Michelle K. Lee
*Deputy Director of the United States Patent and Trademark Office*